United States Patent [19]

Buckley

[11] 4,316,650
[45] Feb. 23, 1982

[54] SEALED PRISM ASSEMBLY

[75] Inventor: Jim Buckley, Wilsonville, Oreg.

[73] Assignee: McHenry Systems, Inc., Donald, Oreg.

[21] Appl. No.: 153,044

[22] Filed: May 27, 1980

[51] Int. Cl.³ .............................................. G02B 7/18
[52] U.S. Cl. ..................................... 350/67; 350/102
[58] Field of Search ................... 350/67, 65, 102, 103, 350/287

[56] References Cited
FOREIGN PATENT DOCUMENTS 425138  3/1935  United Kingdom ................ 350/103

Primary Examiner—Jon W. Henry
Attorney, Agent, or Firm—Kolisch, Hartwell & Dickinson

[57] ABSTRACT

A sealed prism assembly including a prism having a cylindrical body region which terminates at one of its ends with an annular flange. Encasing the body region and fitting closely thereabout is a cylindrical cup terminating at a circular end which contacts the flange. A silicone rubber sealant distributed between the prism body region and the cup forms an expandable-contractable air-tight seal therebetween. The prism and cup are encased in a canister in an axially compressed condition.

3 Claims, 2 Drawing Figures

SEALED PRISM ASSEMBLY

BACKGROUND AND SUMMARY

The present invention relates to optical devices, and more particularly, to a sealed prism assembly.

In a recently developed surveying device a pulse of coherent light is beamed from one point toward a reflector located at a second point. The distance between the two points is determined from the round-trip time of travel of the light pulse. The reflector in the device is a trihedral prism constructed to direct reflected light along the path of the incident light, independent of the angle of light incidence. This allows light aimed at the prism to be reflected directly back toward the apparatus, without adjusting the angular disposition of the prism with respect to the incident light.

One problem associated with trihedral prism reflectors, and other similar optical devices, known in the prior art is accumulation of dust and other air-borne material on the inner faces of the prism. Particle accumulation on the prism faces reduces the reflectivity of the prism, thus reducing the distance over which the device can be used accurately. One solution to this problem has been to coat the prism faces with a silver film sealed with a liquid sealer. However, the mirror surfaces formed on the prism faces, while preventing the accumulation of dust thereon, also reduce the reflectivity of the prism.

One general object of the present invention is to provide apparatus for sealing the rear side of a prism, and the like, which overcomes the above-discussed problems known in the prior art.

Another object of the invention is to provide a sealed prism assembly constructed to operate over widely varying temperature and atmospheric pressure conditions.

Yet another object of the invention is to provide such an assembly which is easily constructed and relatively maintenance free.

The prism assembly of the present invention includes a prism having a cylindrical body region which terminates at one of its ends with an annular flange. Encasing the body region is a cup having a wall portion which fits closely and circumferentially thereabout. The cup terminates with a circular end which contacts the prism's flange. An elastomeric sealant distributed between the cup's wall portion and the prism's body region forms an expandable-contractable, air-tight annular seal therebetween.

In a preferred embodiment of the invention, the cup and prism are encased in a canister which is capped at one end. The prism and cup are held in the canister in an axially compressed condition to bias the cup against the prism flange.

These and other objects and features of the present invention will become more fully apparent when the following detailed description of a preferred embodiment of the invention is read in connection with the following drawings, wherein:

FIG. 1 is a partially cutaway side view of an optical assembly constructed according to the present invention; and FIG. 2 is an enlarged view of a portion of the assembly shown at the upper right in FIG. 1.

DETAILED DESCRIPTION OF A PREFERRED EMBODIMENT OF THE INVENTION

Figure 1:
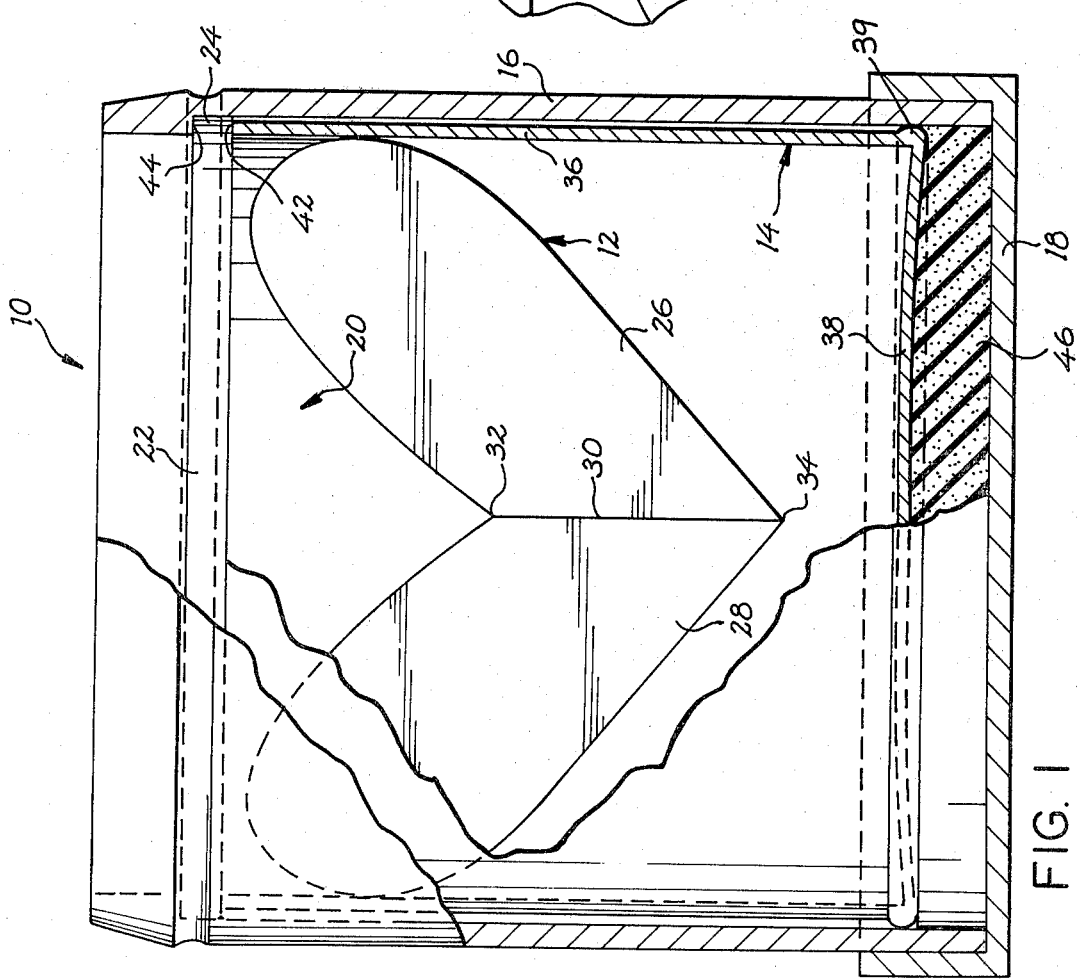

Looking now at the figures, and first particularly at FIG. 1, there is shown at 10 an optical assembly constructed according to the present invention. Assembly 10 generally includes a trihedral prism 12 and a cup 14 which seals the faces of the prism in a manner to be described. Prism 12 and cup 14 are encased in a cylinder canister 16, and are held therein by a cap 18 secured to the bottom end of the canister in the figure.

Prism 12, which is conventional in construction, is composed of a cylindrical body region 20 which joins, adjacent its upper end in FIG. 1, a larger-diameter region 22. The top surface of the region 22 in the figures defines a planar circular front face for the prism. The annular edge of region 22 extends radially outwardly of region 20 to form an annular flange 24.

Formed on the underside of region 20 in FIG. 1 are three identical planar faces, such as faces 26, 28 (visible in FIG. 1). Each face intersects an adjacent face along a linear edge, such as edge 30 between faces 26, 28. The upper end of each edge, such as edge 30, intersects region 20 at a point, such as point 32, with the lower ends of the three intersecting edges meeting at a common point 34 defining the lower extremity of the prism. It can be appreciated from the foregoing that region 20 includes a circumferential band between the lower surface of flange 24 and the uppermost edges of the prism faces, and projecting downwardly from this band and contained on the cylinder projection thereof, three roughly triangular shaped areas whose lower verticies are the points such as point 32. Prism 12 is formed of high grade optical glass or quartz.

Cup 14 includes a cylindrical wall 36 which joins at its lower end in FIG. 1 integrally with a circular base 38. Where base 38 and wall 36 meet, there is formed an annular rim 39 which projects radially outwardly from wall 36, in sliding contact with the inside cylindrical wall surface of canister 16.

Figure 2:
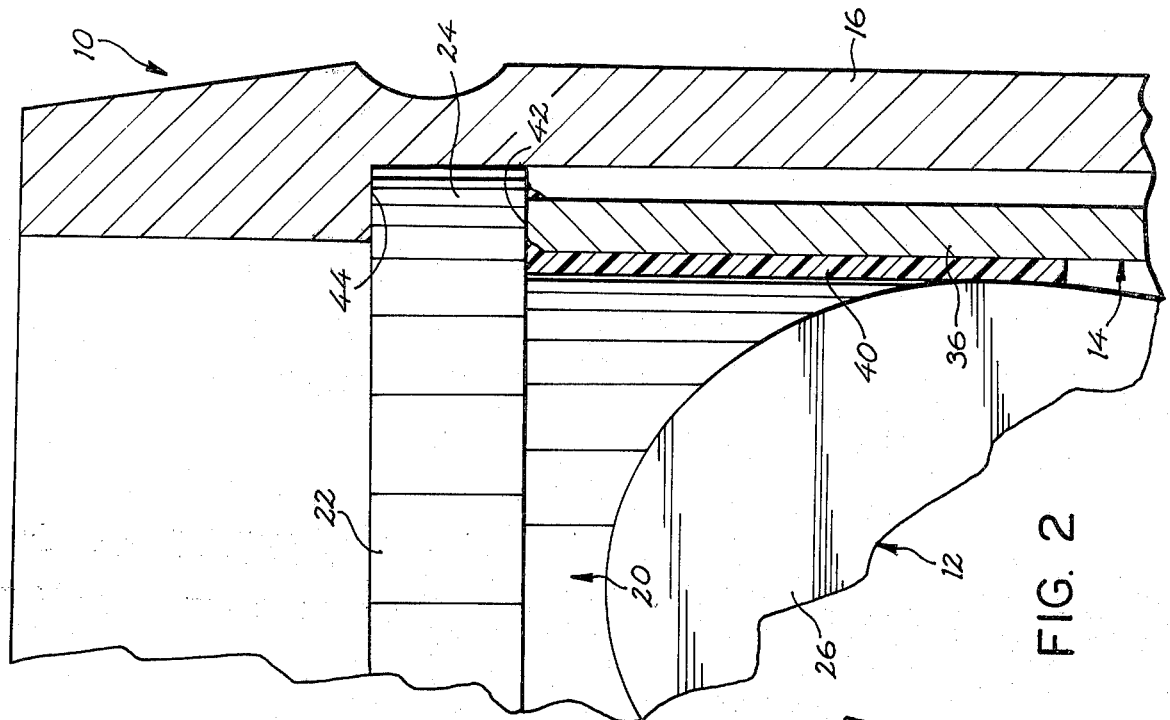

The inside of wall 36 is dimensioned to fit closely and circumferentially about prism region 20. More specifically, and with reference to FIG. 2, region 20 is spaced from confronting portions of wall 36 by a small annular gap in which is distributed an elastomeric sealant, as will be described below. The upper circular end 42 of wall 36 contacts the lower surface of flange 24 circumferentially, as seen in the figures. Cup 14 may be formed of any suitable material, such as aluminum or plastic.

The above-mentioned sealant, distributed in the annular gap between region 20 and confronting portions of wall 36, forms an annular seal 40, therebetween. The sealant is a resilient material which allows the seal to expand and contract radially somewhat to accommodate differential expansion and contraction of the prism and cup with changing temperature.

A preferred method of forming seal 40 is to coat prism region 20 with the sealant, with such in a liquid, uncured state. The prism is then inserted in cup 14, with cup end 42 pressed against flange 24. As can be appreciated in FIG. 2, by this process liquid sealant material adjacent end 42 is forced into the space between the cup's end and flange 24, insuring that the seal extends up to the lower surface of flange 24. A preferred sealant material used in forming seal 40 is a silicone rubber sealant compound. Seal 40 is also referred to herebelow as elastomeric sealing means.

Canister 16 herein takes the form of an elongate, double-opened-ended cylinder which is dimensioned to receive prism 12 and cup 14. Adjacent the top of the canister in the figures, there is formed an inside annular shoulder 44. As can be seen in the figures, shoulder 44 engages the upper surface of flange 24 to support the prism.

A compressible disc-shaped member 46 is held in a compressed condition as shown between cap 18 and the base of cup 14 in the assembly. Member 46 preferably is formed of a resilient sponge-like material.

In forming assembly 10, the prism, and the cup sealed thereto, are slidably inserted in the canister until flange 24 abuts shoulder 44. Member 46 is then placed against the base of the cup, and cap 18 is fitted over the bottom end of the canister as shown in FIG. 1, thus to compress member 46. The cap is secured to the canister by suitable sealing means such as the sealant used in forming seal 40. Cap 18 is also referred to herebelow as means capping the lower end of the canister, and cap 18 and member 46 are referred to jointly as means biasing cup 36 against flange 24. Cup 14, seal 40 and the just-mentioned biasing means form what is referred to herebelow as apparatus for sealing the rear side of the prism.

Compressed member 46 serves two important functions in assembly 10. First by biasing the cup's upper end against flange 24, the member holds the cup in a firm fixed position with respect to the prism—preventing relative movement therebetween which would tend, over a period of time, to loosen and break the seal between the cup and the prism. Secondly, the compressed member serves to hold the prism and cup firmly but resiliently within the canister, a position where the prism is axially aligned with respect thereto. At the same time, the resilience of member 46 provides cushioning for the prism if the assembly is inadvertently dropped or otherwise mishandled.

From the above, it can be appreciated how the various objects and features of the present invention are met. In the assembly, the rear faces of the prism are encased in a cup, with an annular portion of the prism being sealed to the cup by an air-tight seal. The seal is resiliently expandable and contractable to permit differential expansion between the prism and cup with changing temperature. The front of the cup is pressed tightly against a flange on the prism, both to augment the seal, and to prevent relative movement between the cup and prism which would tend to weaken and break the seal over time. The prism and cup are held in the canister by a cushioning member which acts firmly to position the prism in axial alignment with the canister, but which allows cushioned movement of the prism and cup with respect to the canister if the canister is mishandled.

While a specific embodiment of the invention has been described herein, it is appreciated that various modifications and changes may be made without departing from the spirit of the invention.

It is claimed and desired to secure by Letters Patent:

1. Apparatus for sealing the rear side of a prism, where the same includes a cylindrical body region which terminates at one of its ends with an annular outwardly projecting flange, said apparatus in operative condition comprising a cup which encases such body region, said cup having a wall portion which fits closely and circumferentially about such region, terminating with a circular end which contacts such flange, elastomeric sealing means disposed between said cup wall portion and such body region forming an expandable-contractable air-tight annular seal therebetween, an elongate canister in which the prism and cup are slidably received, means located adjacent one end of said canister defining a shoulder for engaging the prism, and means biasing said end against such flange.

2. The apparatus of claim 1, wherein said biasing means includes means capping the other end of said canister, and a compressible member interposed between said capping means and said cup.

3. A sealed prism assembly comprising an elongate canister having an annular shoulder formed on its inner surface adjacent one end of the canister, an elongate prism having a cylindrical body region which terminates at one of its ends with an annular outwardly projecting flange, a cup which encases said body region within said canister, said cup having a wall portion which fits closely and circumferentially about said body region, terminating with circular end which contacts said flange, elastomeric sealing means disposed between said cup wall portion and said body region, forming an expandable-contractable air-tight annular seal therebetween, a cap secured to the other end of said canister, and a compressible member compressibly interposed between said cap and said cup to bias said circular end against said flange, thus to bias said flange against said shoulder.

* * * * *